United States Patent
Koseoglu et al.

(10) Patent No.: US 11,168,266 B2
(45) Date of Patent: Nov. 9, 2021

(54) HEAVY AROMATIC SOLVENTS FOR CATALYST REACTIVATION

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1 day.

(21) Appl. No.: 16/691,303

(22) Filed: Nov. 21, 2019

(65) Prior Publication Data

US 2021/0155858 A1 May 27, 2021

(51) Int. Cl.
*C10G 47/36* (2006.01)
*C10G 47/02* (2006.01)
*B01J 38/56* (2006.01)
*C10G 75/00* (2006.01)

(52) U.S. Cl.
CPC ............. *C10G 47/02* (2013.01); *B01J 38/56* (2013.01); *C10G 47/36* (2013.01); *C10G 75/00* (2013.01); *C10G 2300/202* (2013.01); *C10G 2300/301* (2013.01); *C10G 2300/308* (2013.01); *C10G 2300/4075* (2013.01); *C10G 2300/44* (2013.01); *C10G 2300/703* (2013.01); *C10G 2300/708* (2013.01)

(58) Field of Classification Search
CPC ........ C10G 47/02; C10G 47/36; C10G 75/00; C10G 75/02; C10G 75/04; C10G 2300/44; C10G 2300/202; C10G 2300/708; C10G 2300/703; C10G 2300/308; C10G 2300/4075; C10G 2300/3001; C10G 45/72; B01J 38/56
See application file for complete search history.

(56) References Cited

U.S. PATENT DOCUMENTS

| | | | | |
|---|---|---|---|---|
| 1,921,478 A * | 8/1933 | Pier | ...................... | C07C 29/152 208/112 |
| 2,910,514 A * | 10/1959 | Scott, Jr. | .................. | C07C 6/123 585/471 |
| 3,505,207 A * | 4/1970 | Haney | ..................... | B01J 8/0453 208/108 |
| 3,772,211 A * | 11/1973 | Mounce | .................. | C10G 49/12 502/31 |
| 4,469,909 A * | 9/1984 | Chester | ................... | C10G 47/18 502/77 |
| 4,615,791 A * | 10/1986 | Choi | ....................... | C10G 9/007 208/107 |
| 4,649,127 A | 3/1987 | Degnan et al. | | |
| 5,212,128 A | 5/1993 | Schorfheide et al. | | |
| 5,230,791 A | 7/1993 | Sherwood, Jr. | | |
| 5,306,681 A | 4/1994 | Schorfheide et al. | | |
| 5,372,705 A * | 12/1994 | Bhattacharya | ......... | C10G 47/02 208/108 |
| 5,942,162 A * | 8/1999 | Gamborg | ............... | B01J 8/0492 261/109 |
| 6,469,223 B2 | 10/2002 | Butler | | |
| 7,449,420 B2 | 11/2008 | Hwang et al. | | |
| 9,284,494 B2 | 3/2016 | Bauer et al. | | |
| 10,286,393 B2 | 5/2019 | Park | | |
| 2008/0093260 A1* | 4/2008 | Koseoglu | ............. | C10G 21/003 208/96 |
| 2009/0127161 A1* | 5/2009 | Haizmann | .............. | C10G 11/18 208/59 |
| 2014/0296057 A1* | 10/2014 | Ho | ............................. | B01J 8/02 502/31 |
| 2015/0231611 A1 | 8/2015 | Standing et al. | | |
| 2016/0130506 A1* | 5/2016 | Govindhakannan | ...... | C10C 3/08 106/273.1 |
| 2016/0167039 A1 | 6/2016 | Garcia et al. | | |
| 2018/0066197 A1* | 3/2018 | Koseoglu | ............... | C10G 69/00 |
| 2018/0142167 A1* | 5/2018 | Al-Ghamdi | ............ | C10G 69/06 |
| 2020/0017773 A1* | 1/2020 | Ramamurthy | ......... | C10G 1/002 |
| 2020/0377806 A1* | 12/2020 | Koseoglu | ............... | C10G 65/10 |

OTHER PUBLICATIONS

Hansen, Charles M.; The Three Dimensional Solubility Parameter—Key to Paint Component Affinities: I. Solvents, Plasticizers, Polymers, and Resins; Journal of Paint Technology; Feb. 1967, pp. 104-117, vol. 39, No. 505.
Santolalla-Vargas et al., "In situ reactivation of spent NiMoP/?-Al2O3 catalyst for hydrodesulfurization of straight-run gas oil", Catalysis Today, 329, pp. 44-52, 2019.
Tirado et al., "Batch Reactor Study of the Effect of Aromatic Diluents to Reduce Sediment Formation during Hydrotreating of Heavy Oil", Energy & Fuels, 32, pp. 60-66, 2018.
Hansen et al., "Using Hanse solubility parameters to correlate solubility of C"6"0 fullerene in organic solvents and in polymers", Carbon, Elsevier, vol. 42, 2004.
International Search Report and Written Opinion for PCT Application No. PCT/US2020/061393 dated Feb. 17, 2021.

* cited by examiner

*Primary Examiner* — Michelle Stein
(74) *Attorney, Agent, or Firm* — Bracewell LLP; Constance G. Rhebergen; Kevin R. Tamm

(57) ABSTRACT

Compositions and methods for restoring catalytic activity by dissolving soft coke with a solvent, one method including detecting soft coke deposition on a catalyst composition; preparing an aromatic bottoms composition with a Hildebrand solubility parameter of at least about 20 SI to remove the soft coke from the catalyst composition; and washing the catalyst composition with the aromatic bottoms composition until at least a portion of the soft coke deposition is removed.

21 Claims, No Drawings

HEAVY AROMATIC SOLVENTS FOR CATALYST REACTIVATION

BACKGROUND

Field

Embodiments of the disclosure relate to catalyst reactivation via removal of carbonaceous deposits. In particular, certain embodiments of the disclosure relate to aromatic solvents comprising compounds produced in an aromatics recovery complex applied for de-coking of catalysts used in hydrocarbon conversion processes.

Description of the Related Art

Hydrotreating and hydrocracking catalysts deactivate during hydrocarbon conversion process cycles and have a life cycle between 0.25 and 6 years depending upon the feedstock, catalyst type, and processes configuration. There are instances in which catalysts deactivate rapidly due to rapid coke formation on the catalysts. Coke formed generally can include two types: soft coke and hard coke. Soft coke can be described as organic molecules that can be dissolved by a solvent, and hard coke is a hydrogen deficient substance that can only be removed by regeneration techniques such as, for example, combustion. Soft coke can include aromatic compounds with multiple rings. Coke formation results in increased pressure drop across a catalyst bed or an entire reactor. To alleviate pressure drop issues and restore some catalytic activity, there are several methods applied to remove coke. These methods include solvent washing and hot hydrogen stripping.

Hydrocracking processes are used commercially in a large number of petroleum refineries. They are used to process a variety of feeds boiling in the range of about 370° C. to 520° C. in conventional hydrocracking units and boiling at about 520° C. and above in residue hydrocracking units. In general, hydrocracking processes split molecules of a hydrocarbon feed into smaller, also referred to as lighter, molecules having lower molecular weight, greater average volatility, and greater economic value. Additionally, hydrocracking processes typically improve the quality of the hydrocarbon feedstock by increasing the hydrogen to carbon ratio and by removing organo-sulfur and organo-nitrogen compounds. Economic benefits derived from hydrocracking processes have resulted in development of process improvements and more active catalysts.

In addition to sulfur-containing and nitrogen-containing compounds, hydrocracking feedstreams, such as vacuum gas oil (VGO), contain polynuclear aromatic (PNA) compounds, in other words those containing less than seven fused benzene rings. As the feedstream is subjected to hydrocracking at elevated temperature and pressure, heavy polynuclear aromatic (HPNA) compounds, in other words those containing seven or more fused benzene rings, tend to form and are present in greater concentrations in the unconverted hydrocracker bottoms.

Heavy feedstreams such as de-metalized oil (DMO) or de-asphalted oil (DAO) have much greater concentrations of nitrogen, sulfur, and PNA compounds than VGO feedstreams. These impurities can lessen the overall efficiency of hydrocracking units by requiring greater operating temperature, greater hydrogen partial pressure, or additional reactor and catalyst volume. In addition, greater concentrations of impurities can accelerate catalyst deactivation.

Three major hydrocracking process schemes include single-stage once through hydrocracking, series-flow hydrocracking with or without recycle, and two-stage recycle hydrocracking. Single-stage once through hydrocracking occurs at operating conditions that are more severe than hydrotreating processes, and less severe than conventional full pressure hydrocracking processes. It uses one or more reactors for both treating steps and cracking reactions, so the catalyst must be capable of both hydrotreating and hydrocracking. This configuration is cost effective, but typically results in relatively low product yields (for example, a maximum conversion rate of about 60%). Single-stage hydrocracking is often designed to maximize mid-distillate yield over a single or dual catalyst system. Dual catalyst systems are used in a stacked-bed configuration or in two different reactors. The effluents are passed to a fractionator column to separate the $H_2S$, $NH_3$, light hydrocarbon gas ($C_1$-$C_4$), naphtha, and diesel products boiling in the temperature range of 36° C. to 370° C. Hydrocarbons boiling above about 370° C. are unconverted bottoms that, in a single-stage system, are passed to other refinery operations.

Series-flow hydrocracking with or without recycle uses one reactor (containing both treating and cracking catalysts) or two or more reactors for both treating and cracking reaction steps. Unconverted bottoms from the fractionator column are recycled back into the first reactor for further cracking. This configuration converts heavy crude oil fractions, such as vacuum gas oil, into light products and potentially maximizes the yield of naphtha, jet fuel, or diesel, depending on the recycle cut point used in the distillation section.

Two-stage recycle hydrocracking uses two reactors, and unconverted bottoms from the fractionation column are recycled back into the second reactor for further cracking. Since the first reactor accomplishes both hydrotreating and hydrocracking, the feed to second reactor is virtually free of ammonia and hydrogen sulfide. This permits the use of high performance zeolite catalysts which are susceptible to poisoning by sulfur or nitrogen compounds.

A hydrocracking feedstock includes vacuum gas oils boiling in the nominal range of about 370° C. to about 520° C. DMO or DAO can be blended with vacuum gas oil or used as is and processed in a hydrocracking unit. For instance, a typical hydrocracking unit processes vacuum gas oils that contain from about 10 V % to about 25 V % of DMO or DAO for optimum operation. Substantially undiluted and unmodified DMO or DAO can also be processed for difficult operations. However, a DMO or DAO stream contains significantly more nitrogen compounds (2,000 ppmw vs. 1,000 ppmw) and a higher micro carbon residue (MCR) content than a VGO stream (about 10 W % vs. <1 W %).

DMO or DAO in blended feedstock to a hydrocracking unit can have the effect of lowering the overall efficiency of the unit, for example, by causing greater operating temperature or greater reactor and catalyst volume requirements for existing units, or greater hydrogen partial pressure requirements or additional reactor and catalyst volume requirements for grass-roots units. Impurities can also reduce the quality of the desired intermediate hydrocarbon products in the hydrocracking effluent. When DMO or DAO are processed in a hydrocracker, further processing of hydrocracking reactor effluents may be required to meet refinery fuel specifications, depending upon the refinery configuration. When the hydrocracking unit is operating in its desired mode, for example producing products of good quality, its effluent can be utilized in fuel blending and to produce gasoline, kerosene, and diesel fuel to meet established fuel specifications.

Catalyst deactivation is a physical in addition to or alternative to a chemical process that decreases the activity of a given catalyst, for example by blocking active pore sites. Catalyst poisoning is a result of strong chemisorption of impurities on the catalyst surface, which blocks access of reactants to the active sites. Poisoning occurs when there is a strong chemical interaction of reactants, products, or impurities with the active sites on the catalyst surface. Poisoning by sulfur and particularly nitrogen compounds is a known phenomenon in the refining industry. These compounds are present in the feedstock as organic species or exist in other refinery streams, such as recycle gas in the form of hydrogen sulfide or ammonia. Poisoning by organic compounds can be permanent or irreversible as they adsorb and form coke on the catalyst surface. Poisoning by gaseous compounds such as excess $H_2S$ or $NH_3$ can also be irreversible and dependent on operating temperatures.

Coking (with hard coke) or fouling (with soft coke) is the formation of coke on the catalyst surface. Soft coke can be described as organic molecules strongly adsorbed on the catalyst active sites that can be dissolved by a solvent, and hard coke is hydrogen deficient substance that can only be removed by regeneration techniques such as combustion. Coke formed on catalysts physically blocks access of reactants to active sites by forming a layer on the catalyst. Deactivation occurs as a result of carbonaceous residues covering the active sites of the catalyst surface thereby decreasing the active surface area.

Sintering is the loss of active sites due to structure alteration of the catalysts. For example, well-dispersed small size active phase metals can undergo agglomeration, thereby losing catalyst activity. Zeolites can also lose their crystallinity, thereby losing their activity.

Metal deposition is due to deposition of feedstock contaminants such as nickel and vanadium in the pores of the catalysts and blocking the pores of the catalysts. Vanadium and nickel, both present in hydrocarbon feedstock as organometallic compounds, are known poisons encountered in catalytic cracking and hydrocracking processes. For example, vanadium is converted to the oxide in the regenerator of a fluidized catalytic cracking (FCC) unit. Vanadium is then able to migrate to the zeolite catalyst and form a low melting point eutectic with the alumina-silica of the zeolite structure. This leads to permanent destruction of the zeolite and a significant loss of activity.

In hydrocracking processes, a hydrodemetallization layer is added before the hydrocracking catalyst in the reactor to capture the metals present in the feedstock. In addition to the feedstock contaminants, dust, tramp iron, inorganic scales from heaters and exchangers, and polymers formed from feedstock components are common foulants that result in a decrease of catalyst activity. These contaminants deposit on the catalyst surface causing pore mouth narrowing and eventual total plugging of the catalyst surface.

A catalyst can be deactivated by any one of or any combination of the above-mentioned causes. Catalyst activity can be restored if the catalyst is poisoned in addition to or alternative to being coked. However, catalyst activity generally cannot be recovered if there is sintering in addition to or alternative to metal deposition. Catalysts are reactivated in situ in a reactor by solvent washing or hot hydrogen stripping, if the coke is soft enough to be removed.

Many prior art systems and methods for solvent washing and hot hydrogen stripping exist; however, such systems are insufficient for reliable, efficient, and effective soft coke removal.

SUMMARY

Applicant has recognized a need for compositions and methods for removing coke from catalysts using advantageous heavy aromatic solvent materials. In embodiments disclosed here, low value heavy aromatic hydrocarbons, for example produced as the bottoms product from a xylene rerun column of an aromatics recovery complex, surprisingly and unexpectedly can be used to remove coke from valuable catalysts. The coke can include soft coke or a mixture of soft coke and hard coke precursors.

In embodiments disclosed here, an aromatic bottoms stream from an aromatic recovery complex, which is aromatic and has a high Hildebrand solubility factor, is used as a solvent to wash off the soft coke from catalyst surfaces as a solvent in a hydrotreating or hydrocracking unit to recover and regenerate catalyst activity. Embodiments of compositions and methods disclosed here can be applied in both hydrotreating and hydrocracking processes for recovery of catalyst activity by solvent washing.

In refineries with an aromatic complex, the reformate fraction from the catalytic reforming unit is processed in the aromatic complex to recover high value aromatics, such as benzene, toluene and xylenes, commonly referred to as BTX. Reformate from the catalytic reforming unit is split into light and heavy reformate. The light reformate is sent to a benzene extraction unit to extract the benzene and recover almost benzene-free gasoline (about less than 1 V % benzene). The heavy reformate stream is sent to a p-xylene extraction unit to recover p-xylene. Other xylenes are recovered and sent to a xylene isomerization unit to convert them to p-xylene.

The converted fraction is recycled back to the p-xylene extraction unit. The heavy fraction from the p-xylene extraction unit is recovered as process reject or bottoms. Since olefins are detrimental in the extraction and adsorption processes within an aromatic recovery complex, they are usually removed using a clay tower or selective hydrogenation. Due to the acidic nature of the clays, olefinic aromatics such as styrene react with another aromatic molecule via an alkylation reaction to form bridged di-aromatic molecules. After the separation of $C_{6-8}$ aromatics or $C_6$-$C_{10}$ aromatics (depending on refinery set up), remaining di-aromatic molecules are disposed in the process reject or bottoms stream of the aromatic complex, which is a low-quality stream to be used as a gasoline blending component or as a low-value fuel oil blending component. However, this heavy aromatic stream comprising di-aromatic compounds ($C_{9+}$, $C_{10+}$, or $C_{11+}$) can advantageously be used to remove soft coke from catalyst surfaces by dissolving the coke.

Therefore, disclosed here is a method for restoring catalytic activity by dissolving soft coke with a solvent, the method including detecting soft coke deposition (or hard coke precursor deposition) on a catalyst composition; preparing an aromatic bottoms composition with a Hildebrand solubility parameter of at least about 20 (SI) to remove the soft coke from the catalyst composition; and washing the catalyst composition with the aromatic bottoms composition until at least a portion of the soft coke deposition is removed. In some embodiments, the step of detecting soft coke deposition on the catalyst composition comprises detecting a pressure drop increase over a catalyst bed comprising the catalyst composition of at least about 1 bar. In certain other embodiments, the step of detecting soft coke deposition on the catalyst composition comprises detecting a radial temperature profile change in a reactor of at least about 1° C.

In certain embodiments, the aromatic bottoms composition comprises aromatic bottoms from an aromatic recovery complex. Still in other embodiments, the aromatic bottoms composition comprises aromatic bottoms from a xylene rerun column of an aromatic recovery complex. In other embodiments, the aromatic bottoms composition consists essentially of aromatic bottoms from a xylene rerun column of an aromatic recovery complex. Still in other embodiments, the aromatic bottoms composition consists of aromatic bottoms from a xylene rerun column of an aromatic recovery complex. The aromatic bottoms composition can comprise, consist essentially of, or consist of $C_{9+}$ aromatic compounds, $C_{10+}$ aromatic compounds, or $C_{11+}$ aromatic compounds. In some embodiments, the method includes the step of verifying the portion of the soft coke deposition is removed by testing the aromatic bottoms composition for an increase in organic molecule type.

Still in other embodiments of the method, soft coke deposition on the catalyst composition is formed in a hydrocracking or hydrogenation reactor. In certain embodiments, soft coke deposition on the catalyst composition is formed from treatment of naphtha or residual oil. Still in other embodiments, the method further includes the step of reducing a reactor temperature by between about 10° C. and about 300° C. before the washing step, or between about between about 100° C. and about 300° C. In certain other embodiments, the step of washing proceeds for at least about 6 hours. In some embodiments, the step of washing proceeds for at least about 12 hours. Still in other embodiments, the aromatic bottoms composition includes at least 50 wt. % $C_{9+}$ aromatic hydrocarbons. In certain embodiments, the aromatic bottoms composition exhibits a Hildebrand solubility parameter of at least about 21 (SI).

Additionally disclosed here is a method for hydrocracking a hydrocarbon feedstock to reduce soft coke deposition, the method including hydrocracking the hydrocarbon feedstock in a reactor at a reaction temperature in a range of from about 300° C. to about 500° C., at a reaction pressure in the range of from about 50 bars to about 200 bars, at a hydrogen feed rate up to about 2500 standard liters per liter of hydrocarbon feed (SLt/Lt), and a hydrocarbon feed rate in the range of from about 0.25 h$^{-1}$ to about 3.0 h$^{-1}$ liquid hourly space velocity; detecting a pressure drop over a catalyst bed in the reactor; reducing the temperature of the reactor; reducing flow of the hydrocarbon feedstock; providing to the catalyst bed an aromatic bottoms composition with a Hildebrand solubility parameter of at least about 20 to remove soft coke from a catalyst composition in the catalyst bed; and re-starting hydrocracking of the hydrocarbon feedstock.

In some embodiments, the step of detecting includes detecting a pressure drop of at least about 1 bar. Still in other embodiments, the step of reducing the temperature of the reactor includes reducing the temperature by at least about 100° C. In certain embodiments, the aromatic bottoms composition liquid hourly space velocity is between about 0.1 h$^{-1}$ to about 10 h$^{-1}$. Still in other embodiments, the step of providing to the catalyst bed the aromatic bottoms composition comprises washing the catalyst bed with the aromatic bottoms composition for at least about 6 hours. In certain other embodiments, the aromatic bottoms composition comprises aromatic bottoms from an aromatic recovery complex. The aromatic bottoms composition can comprise, consist essentially of, or consist of $C_{9+}$ aromatic compounds, $C_{10+}$ aromatic compounds, or $C_{11+}$ aromatic compounds. Still in other embodiments, the aromatic bottoms composition comprises aromatic bottoms from a xylene rerun column of an aromatic recovery complex.

In some embodiments, the aromatic bottoms composition consists essentially of aromatic bottoms from a xylene rerun column of an aromatic recovery complex. Still in other embodiments, the aromatic bottoms composition consists of aromatic bottoms from a xylene rerun column of an aromatic recovery complex. In still other embodiments the method includes the step of verifying soft coke removal by testing the aromatic bottoms composition for an increase in organic molecule type. In certain embodiments, the aromatic bottoms composition includes at least 50 wt. % $C_{9+}$ aromatic hydrocarbons. Still in other embodiments, the aromatic bottoms composition exhibits a Hildebrand solubility parameter of at least about 21 (SI).

BRIEF DESCRIPTION OF THE DRAWINGS

No drawings.

DETAILED DESCRIPTION

So that the manner in which the features and advantages of the embodiments of compositions and methods for soft coke removal may be understood in more detail, a more particular description of the embodiments of the present disclosure briefly summarized previously may be had by reference to the embodiments thereof, which are described as a part of this specification. It is to be noted, however, that the various embodiments are not to be considered limiting of the present disclosure's scope, as it may include other effective embodiments as well.

Embodiments disclosed here show that the aromatic bottoms stream from an aromatic recovery complex possesses a high solubility factor compared with straight run petroleum fractions. The Hildebrand solubility scale (described, for example, in "Standard Hildebrand values from Hansen.", Journal of Paint Technology, Vol. 39, No. 505, February 1967) is an accepted scale used in the oil and gas industry to describe solvents.

The Hildebrand solubility parameter is derived in part from the cohesive energy density of the solvent, which in turn is derived from the heat of vaporization. When a liquid is heated to its boiling point, energy is added to the liquid, resulting in an increase in the temperature of the liquid. Once the liquid reaches its boiling point, however, the further addition of heat does not cause a further increase in temperature.

The energy that is added is entirely used to separate the molecules of the liquid and boil them away into a gas. If the amount of energy (in calories) added from the onset of boiling to the point when all the liquid has boiled away were measured, it will provide a direct indication of the amount of energy required to separate the liquid into a gas, and thus the amount of van der Waals forces that held the molecules of the liquid together. The amount of heat required to separate the molecules is instructive. A liquid with a low boiling point may require considerable energy to vaporize, while a liquid with a higher boiling point may vaporize quite readily, or vice versa. The energy required to vaporize the liquid is called the heat of vaporization. From the heat of vaporization, the cohesive energy density is calculated by Equation 1:

$$c = \frac{\Delta H - R * T}{Vm}. \qquad \text{Eq. 1}$$

In Equation 1, c is cohesive energy density, $\Delta H$ is heat of vaporization, R is the ideal gas constant, T is temperature, and Vm is molar volume. For cohesive energy density, c is represented in kcal cm$^{-3}$, Vm is represented in cm$^3$ mol$^{-1}$, T is represented in Kelvin (K), $\Delta H$ is represented in kcal mol$^{-1}$, and R is represented in kcal K$^{-1}$ mol$^{-1}$.

Hildebrand solubility proposes a solubility parameter, the square root of the cohesive energy density, as a numerical value indicating the solvency behavior of a specific solvent, shown by Equation 2.

$$\delta = \left[\frac{\Delta H - R * T}{Vm}\right]^{1/2}. \qquad \text{Eq. 2}$$

In Equation 2, $\delta$ is represented in (calories per cm$^3$)$^{1/2}$ (common form) or MPa$^{1/2}$ (SI). Common form is derived from cohesive energy densities in calories/cc, and standard international units (SI units), are derived from cohesive pressures. The SI unit for expressing pressure is the pascal, and SI Hildebrand solubility parameters are expressed in mega-pascals (1 mega-pascal or mpa=1 million pascals). SI parameters are about twice the value of standard parameters. Since Hildebrand solubility parameters are not readily available, solubility parameters for kerosene, light gas oil, and an aromatic bottoms stream were calculated here, with the results shown in Table 1. Values for individual organic solvents are also shown in Table 1.

TABLE 1

Hildebrand solubility parameters of solvents.

| Solvent | $\delta$ = MPa$^{1/2}$ (SI) |
| --- | --- |
| Heptane | 15.3 |
| n-Dodecane | 16.0 |
| Benzene | 18.7 |
| Kerosene | 16.3 |
| Light gas oil | 15.7 |
| Heavy Aromatic Bottoms (full range) | 20.7 |
| Heavy Aromatic Bottoms 180° C.+ | 21.2 |

As seen in Table 1, heptane, a paraffinic solvent with a carbon number of 7, exhibits a Hildebrand solubility parameter (HSB) of 15.3 and n-dodecane, a paraffinic solvent with carbon number of 12, exhibits a HSB value of 16. Benzene, a mono-aromatic solvent with a carbon number of 6, exhibits a HSB value of 18.7. Kerosene's HSB is 16.3, showing that it is composed of paraffinic and aromatic components. Light gas oil is more paraffinic in nature based on the HSB compared with the kerosene fraction. The aromatic bottoms stream, whether its full range stream as-received from an aromatic recovery complex, or the fraction boiling above 180° C., exhibits greater HSB values in the range of 20.7-21.7. Based on the HSB values, the aromatic bottoms stream (ABS) obtained from an aromatic recovery complex is a powerful solvent for soft coke and mixtures of coke. Examples described further here demonstrate that this solvent removes soft coke formed on catalysts.

In some embodiments, coke is formed in an integrated hydrocracking process for producing cracked hydrocarbons from a hydrocarbon feedstock. The process can include hydrocracking the feedstock in a reactor to produce hydrocracking reactions at a reaction temperature in the range of from about 300° C. to about 500° C.; at a reaction pressure in the range of from about 50 bars to about 200 bars; at a hydrogen feed rate up to about 2500 standard liters per liter of hydrocarbon feed (SLt/Lt); and at a hydrocarbon feed rate liquid hourly space velocity (LHSV) in the range of from about 0.25 h$^{-1}$ to 3.0 h$^{-1}$.

A method to recover catalyst activity and regenerate the catalyst using a solvent can include observing a reaction pressure drop during a hydrocracking or hydrotreating operation in a unit prior to washing of the catalyst bed; shutting-down the unit by reducing all bed temperatures to below a set limit; stopping the hydrocracking or hydrotreating hydrocarbon feedstock flow to the unit; charging a wash solvent to reduce the pressure drop in the unit under hydrogen flow; and starting the unit back up to return to the operating conditions. In some embodiments, a pressure drop in a reactor is about 1 bar, or about 2 bars, or more than 3 bars before shutting down reactor operations for catalyst regeneration by addition of heavy aromatic bottoms solvent. In some embodiments, the reactor temperature is lowered by at least about 10° C., 100° C., or at least about 200° C., or at least about 300° C.

In some embodiments, the step of detecting soft coke deposition on the catalyst composition comprises detecting a radial temperature profile change in a reactor of at least about 1° C. Reactor temperature measure includes two types: radial and axial. Radial temperature measure includes horizontal temperature location across the diameter of a reactor, and axial temperature measure includes vertical temperature location along the reactor height. These temperature measures are generally applicable for all type of reactors, but most common for fixed-bed reactors. Thermocouples can be located, therefore, at multiple locations horizontally across the diameter of a fixed bed and at multiple locations vertically through the height of a fixed bed. If there is a change in temperature between two thermocouples, it is commonly an indication of coking proximate that thermocouple in the reactor, for example in a fixed bed of catalyst.

In some embodiments, the hydrogen to oil ratio is at least 3 times hydrogen consumption. In some embodiments, where solvent washing is carried out at temperatures below about 250° C., hydrogen application is not required. In embodiments where hydrogen application with solvent washing is required, hydrogen can be provided via a recycle gas containing hydrogen sulfide, which is used to maintain certain catalysts in a sulfide state.

In some embodiments, heavy aromatic bottoms solvent liquid hourly space velocity is between about 0.1 h$^{-1}$ to about 10 h$^{-1}$, between about 0.5 h$^{-1}$ to about 5 h$^{-1}$, or between about 1 h$^{-1}$ to about 3 h$^{-1}$. In some embodiments, a solvent wash proceeds for at least about 6 hours or at least about 12 hours or at least about 24 hours. In some embodiments, the solvent comprises more than about 50 wt. %, more than about 70 wt. %, more than about 90 wt. %, or more than about 95 wt. % aromatic C$_{9+}$ (C$_9$ and greater) aromatic hydrocarbons.

In some embodiments, when solvent washing is completed, the feedstock is switched from aromatic solvent to hydrocracking feedstock and the temperature of the hydrocracking reactor is increased to the operating temperature by at least about 10° C., or at least about 100° C.

Advantages include utilizing aromatic rich streams to recover hydrotreating in addition to or alternative to hydrocracking catalyst activity by removing soft coke or any polymeric material deposited on the catalyst, including mixtures of soft coke with other materials such as hard coke precursors. Reactor pressure drop increase is a common problem in many hydrocarbon conversion processes, and embodiments disclosed here enable the operations to recover the catalyst activity. Aromatic recovery complex bottoms are applied as a solvent to recover hydrocracking and hydrotreating catalyst activity by washing deposited heavy hydrocarbons on catalyst surfaces. Experiments are discussed as follows.

Example 1. A hydrocracking pilot plant test was conducted using an aromatic rich cracking feedstock having the following properties: density 0.9195 g/cc, 2.56 wt. % sulfur, 499 ppmw nitrogen, and simulated distillation data shown in Table 2.

TABLE 2

| Simulated distillation data for Example 1 hydrocarbon feedstock. | |
|---|---|
| Initial boiling point | 239° C. |
| 5 wt. % | 314° C. |
| 10 wt. % | 345° C. |
| 30 wt. % | 423° C. |
| 50 wt. % | 444° C. |
| 70 wt. % | 491° C. |
| 90 wt. % | 526° C. |
| 95 wt. % | 534° C. |
| Final boiling point | 545° C. |

A hydrocracking test was run at 120 bar, 390° C., LHSV of 0.426 $hr^{-1}$, and $H_2$ to oil ratio of 1000 standard liters of hydrogen per liter of oil. The test was run for 30 days. Afterward, catalyst bed temperature was reduced to 205° C. at a rate of 10° C. per hour in the presence of the same feed while maintaining the pressure of 120 bar. The aromatic rich cracking feedstock was then switched to an aromatic solvent comprising heavy aromatic bottoms having the following properties: density at 0.8825 g/cc and simulated distillation data according to Table 3.

TABLE 3

| Simulated distillation data for Example 1 heavy aromatic solvent. | |
|---|---|
| Initial Boiling Point | 153° C. |
| 5 wt. % | 163° C. |
| 10 wt. % | 164° C. |
| 30 wt. % | 166° C. |
| 50 wt. % | 172° C. |
| 70 wt. % | 174° C. |
| 90 wt. % | 187° C. |
| 95 wt. % | 195° C. |
| Final boiling point | 208° C. |

The pressure was reduced to 30 bar with the same $H_2$ to oil ratio. The bed temperature was raised to 310° C. and ran for 18 hours. Pressure can be reduced quickly to about 30 bars, for example at a rate of about 30 bars or less per hour. The product catalyst was collected for analysis.

Example 2. Aromatic recovery complex bottoms samples before and after the solvent washing were analyzed using Fourier-transform ion cyclotron resonance mass spectrometry (FT-ICR-MS). Table 4 shows the species in the wash solvent before and after the washing. Description of species are as follows: HC denotes hydrocarbon molecules detected; N denotes the molecules containing one nitrogen atom; S denotes the molecules containing one sulfur atom; S2 denotes the molecules containing two sulfur atoms; and S3 denotes the molecules containing three sulfur atoms. As seen, the solvent contains more species after the wash, so it can be concluded that the solvent removed adsorbed species on the catalyst surface, including soft coke in addition to or alternative to hard coke precursors.

Tested catalysts included a mixture of hydrocracking pretreat catalyst and hydrocracking catalysts. The pretreat catalysts desulfurize, denitrogenize, and hydrocrack feedstock in the range of 20-50 wt. %, and the hydrocracking catalyst is for cracking of the unconverted fraction. Pretreat catalysts can include alumina, silica, titania or combinations thereof, optionally further including Ni, Co, Mo, and/or W as active phase metals. Hydrocracking catalysts can contain non-zeolitic supports such as alumina, silica, titania, or combination thereof. Suitable zeolitic catalyst for treatment can include about 1 wt. % to about 80 wt. % zeolite, and one or more non-crystalline binder such as alumina, silica, titania or combination thereof, optionally further including Ni, Co, Mo, and/or W as active phase metals. Solvent washing described here can be applied to hydrocracking catalysts and also all hydrotreating catalysts, from stages including naphtha treatment to residual oil treatment.

Generally the term residual oil includes atmospheric residue from atmospheric columns boiling at and above about 370° C. and vacuum residue. When the atmospheric residue is sent to vacuum distillation column, vacuum gas oils boiling in the range of about 370-565° C. are recovered, and the bottoms include the vacuum residue, which boils above about 565° C.

The increase in number of molecule types exhibits that the molecules, including soft coke in addition to or alternative to hard coke precursors, were desorbed from the catalyst surfaces. The FT-ICR-MS data shows that these molecular species have high double bond equivalent (DBE) values, indicative of aromaticity of the molecules. The solvent washing over catalyst does not cause reactivity of the solvent, because hydrogenation of aromatic components and cracking of the solvent was not observed. FT-ICR-MS data indicates solvent washing to remove chem-adsorbed species without reaction of the solvent itself

TABLE 4

| Number of molecule types before and after solvent washing of catalyst. | | | |
|---|---|---|---|
| Species | Before | After | Difference |
| HC | 330 | 480 | 150 |
| N | 1 | 5 | 4 |
| S | 1 | 75 | 74 |
| S2 | 1 | 1 | 0 |
| S3 | 0 | 2 | 2 |

A low value heavy aromatic stream was utilized to wash catalyst in a hydrocracking unit that was fouled by organic deposition. In some embodiments a heavy aromatic solvent for soft coke washing and removal comprises $C_{9+}$, $C_{10+}$, or $C_{11+}$ heavy aromatic compounds, depending on if $C_{9+}$ in addition to or alternative to $C_{10+}$ compounds have been separated out of a mixed aromatic bottoms product. In embodiments disclosed here, aromatic bottoms compositions are used to remove soft coke comprising multiple aromatic ring compounds and are not necessarily used to remove polymerization products.

The singular forms "a," "an," and "the" include plural referents, unless the context clearly dictates otherwise. The term "about" when used with respect to a value or range refers to values including plus and minus 5% of the given value or range.

In the drawings and specification, there have been disclosed example embodiments of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for restoring catalytic activity by dissolving soft coke with a solvent, the method comprising the steps of:
   detecting soft coke deposition on a catalyst composition;
   preparing an aromatic bottoms composition comprising low-quality bottoms product from a xylene rerun column of an aromatics recovery complex with bridged di-aromatic molecules and at least 50 wt. % $C_{9+}$ aromatic hydrocarbons, wherein $C_{6-8}$ aromatics have been separated out, and with a Hildebrand solubility parameter of 20 (SI) or greater to remove the soft coke from the catalyst composition; and
   washing the catalyst composition with the aromatic bottoms composition until at least a portion of the soft coke deposition is removed in order to recover hydocracking and hydrotreating catalyst activity.

2. The method according to claim 1, where the step of detecting soft coke deposition on the catalyst composition comprises detecting a pressure drop increase over a catalyst bed comprising the catalyst composition of at least about 1 bar.

3. The method according to claim 1, where the step of detecting soft coke deposition on the catalyst composition comprises detecting a radial temperature profile change in a reactor of at least about 1° C.

4. The method according to claim 1, where the aromatic bottoms composition consists essentially of aromatic bottoms from a xylene rerun column of an aromatic recovery complex.

5. The method according to claim 1, where the aromatic bottoms composition consists of aromatic bottoms from a xylene rerun column of an aromatic recovery complex.

6. The method according to claim 1, further comprising the step of verifying the portion of the soft coke deposition is removed by testing the aromatic bottoms composition for an increase in organic molecule type.

7. The method according to claim 1, where soft coke deposition on the catalyst composition is formed in a hydrocracking or hydrogenation reactor.

8. The method according to claim 1, where soft coke deposition on the catalyst composition is formed from treatment of naphtha or residual oil.

9. The method according to claim 1, further comprising the step of reducing a reactor temperature by between about 100° C. and about 300° C. before the washing step.

10. The method according to claim 1, where the step of washing proceeds for at least about 6 hours.

11. The method according to claim 1, where the step of washing proceeds for at least about 12 hours.

12. The method according to claim 1, where the aromatic bottoms composition exhibits a Hildebrand solubility parameter of at least about 21 (SI).

13. A method for hydrocracking a hydrocarbon feedstock to reduce soft coke deposition, the method comprising the steps of:
    hydrocracking the hydrocarbon feedstock in a reactor at a reaction temperature in a range of from about 300° C. to about 500° C., at a reaction pressure in the range of from about 50 bars to about 200 bars, at a hydrogen feed rate up to about 2500 standard liters per liter of hydrocarbon feed (SLt/Lt), and a hydrocarbon feed rate in the range of from about 0.25 $h^{-1}$ to about 3.0 $h^{-1}$ liquid hourly space velocity;
    detecting a pressure drop over a catalyst bed in the reactor;
    reducing the temperature of the reactor;
    reducing flow of the hydrocarbon feedstock;
    providing to the catalyst bed an aromatic bottoms composition comprising low-quality bottoms product from a xylene rerun column of an aromatics recovery complex with bridged di-aromatic molecules and at least 50 wt. % $C_{9+}$ aromatic hydrocarbons, wherein $C_{6-8}$ aromatics have been separated out, and with a Hildebrand solubility parameter of 20 (SI) or greater to remove soft coke from a catalyst composition in the catalyst bed; and
    re-starting hydrocracking of the hydrocarbon feedstock.

14. The method according to claim 13, where the step of detecting includes detecting a pressure drop of at least about 1 bar.

15. The method according to claim 13, where the step of reducing the temperature of the reactor includes reducing the temperature by at least about 100° C.

16. The method according to claim 13, where the aromatic bottoms composition liquid hourly space velocity is between about 0.1 $h^{-1}$ to about 10 $h^{-1}$.

17. The method according to claim 13, where the step of providing to the catalyst bed an aromatic bottoms composition comprises washing the catalyst bed with the aromatic bottoms composition for at least about 6 hours.

18. The method according to claim 13, where the aromatic bottoms composition consists essentially of aromatic bottoms from a xylene rerun column of an aromatic recovery complex.

19. The method according to claim 13, where the aromatic bottoms composition consists of aromatic bottoms from a xylene rerun column of an aromatic recovery complex.

20. The method according to claim 13, further comprising the step of verifying soft coke removal by testing the aromatic bottoms composition for an increase in organic molecule type.

21. The method according to claim 13, where the aromatic bottoms composition exhibits a Hildebrand solubility parameter of at least about 21 (SI).

* * * * *